June 11, 1963  J. W. McLEAN  3,092,875
STOP MOTION MECHANISM
Filed Nov. 3, 1959  9 Sheets-Sheet 1

INVENTOR.
John W. McLean,
BY
Paul & Paul
ATTORNEYS.

June 11, 1963 J. W. McLEAN 3,092,875
STOP MOTION MECHANISM
Filed Nov. 3, 1959 9 Sheets-Sheet 2

INVENTOR.
John W. McLean,
BY Paul & Paul
ATTORNEYS.

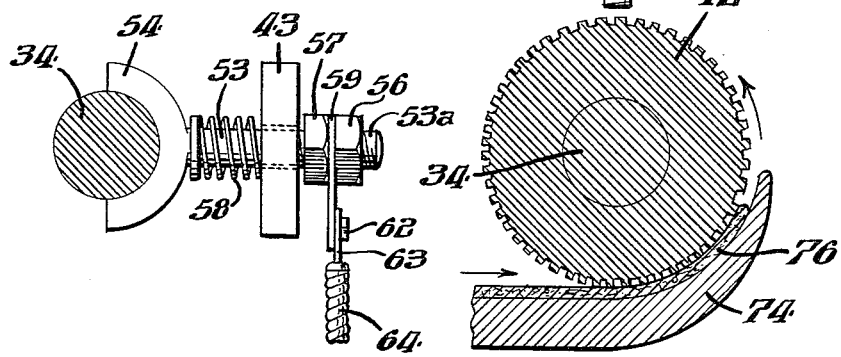
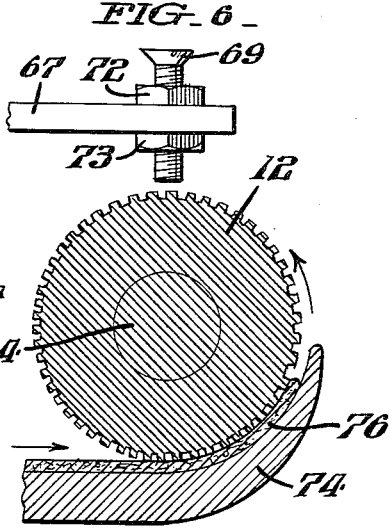
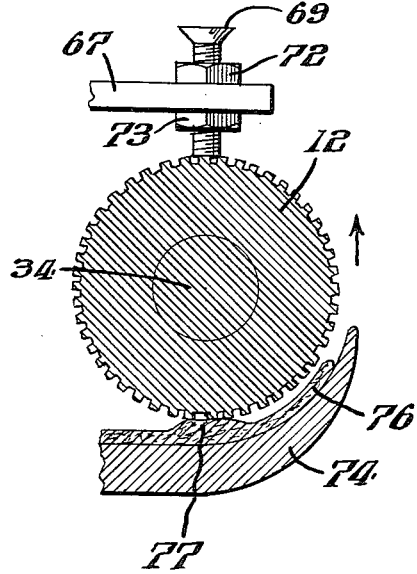
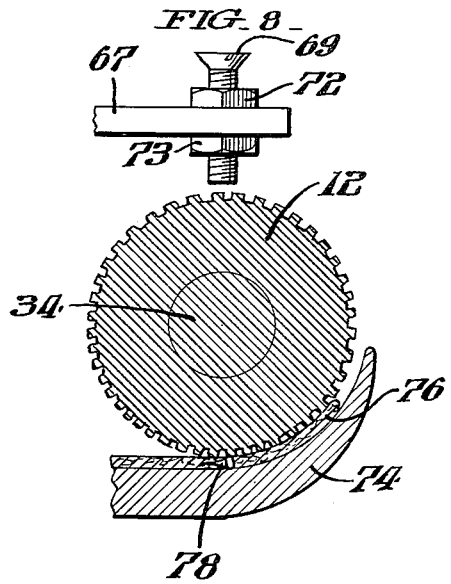

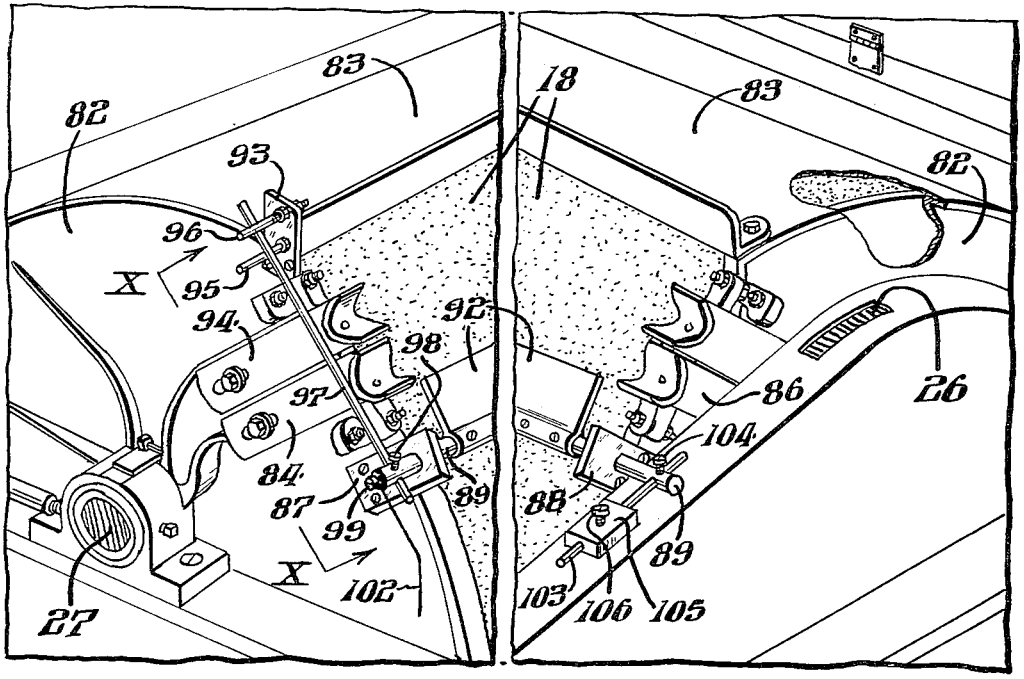
FIG_9_
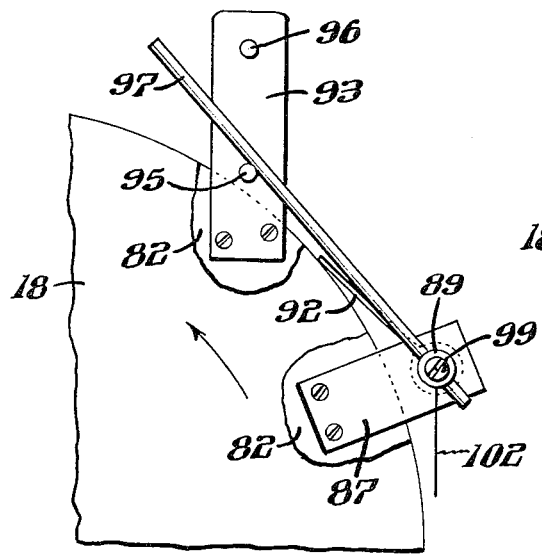
FIG_10_
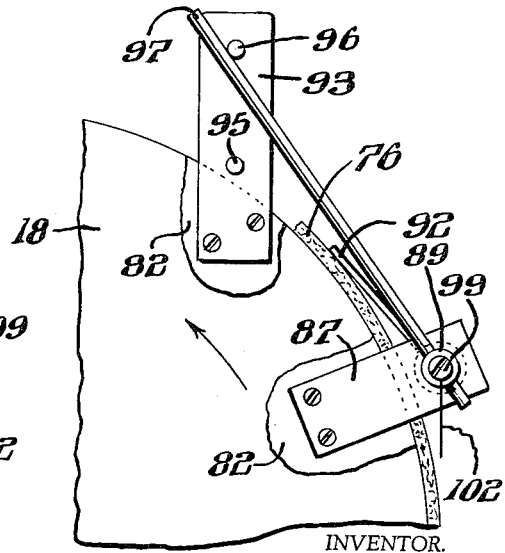
FIG_11_

June 11, 1963  J. W. McLEAN  3,092,875
STOP MOTION MECHANISM
Filed Nov. 3, 1959  9 Sheets-Sheet 5
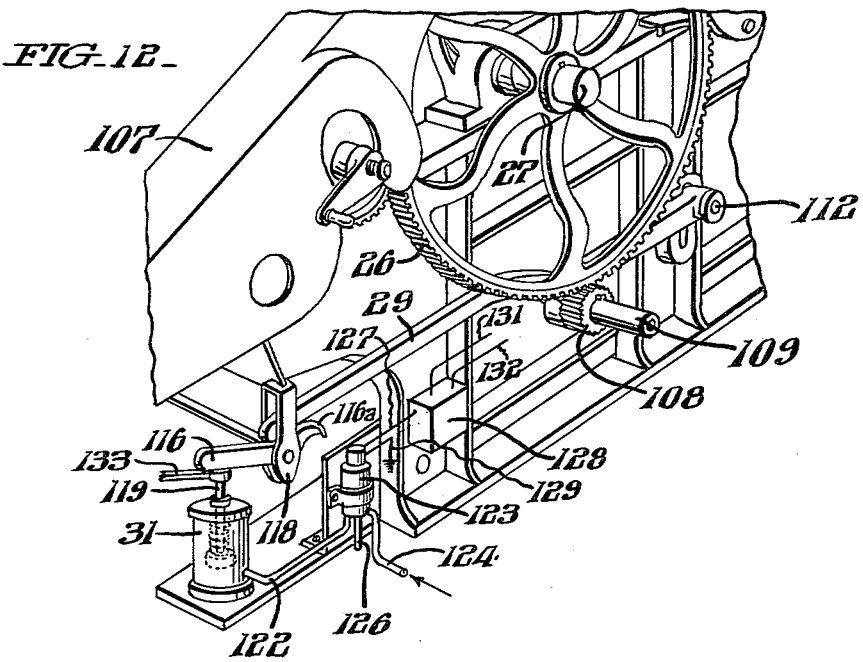
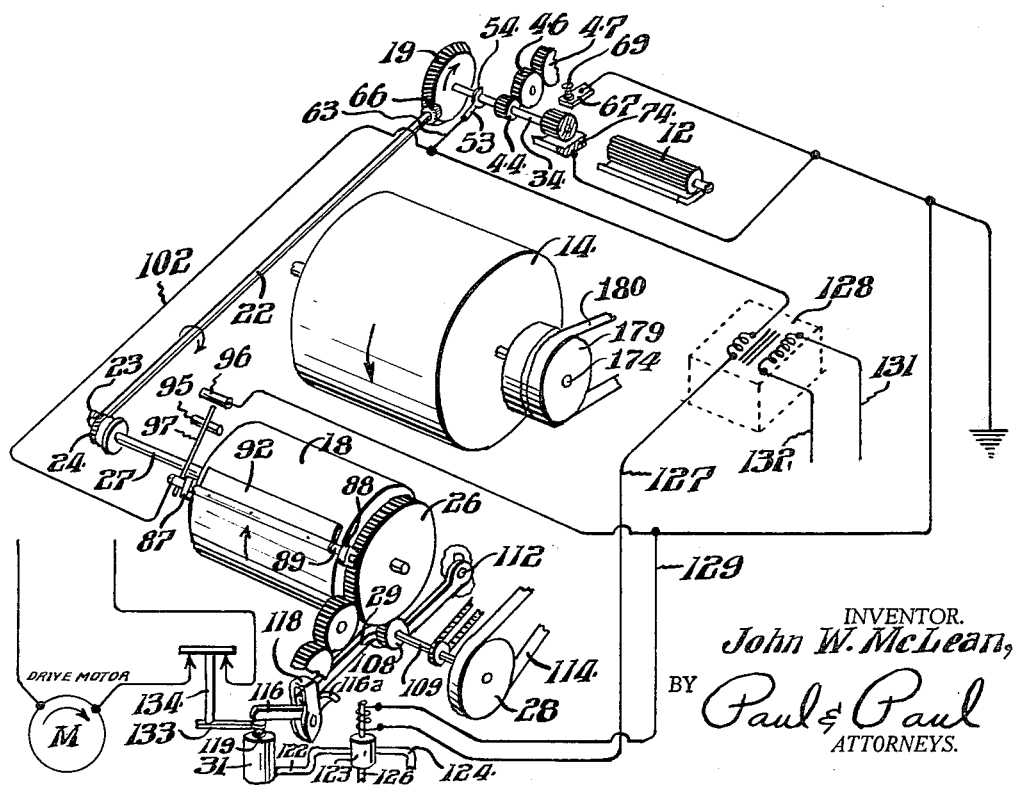
INVENTOR.
John W. McLean,
BY Paul & Paul
ATTORNEYS.

June 11, 1963  J. W. McLEAN  3,092,875
STOP MOTION MECHANISM
Filed Nov. 3, 1959  9 Sheets-Sheet 6

INVENTOR.
John W. McLean,
BY Paul & Paul
ATTORNEYS.

June 11, 1963
J. W. McLEAN
3,092,875
STOP MOTION MECHANISM
Filed Nov. 3, 1959
9 Sheets-Sheet 7
FIG-16-
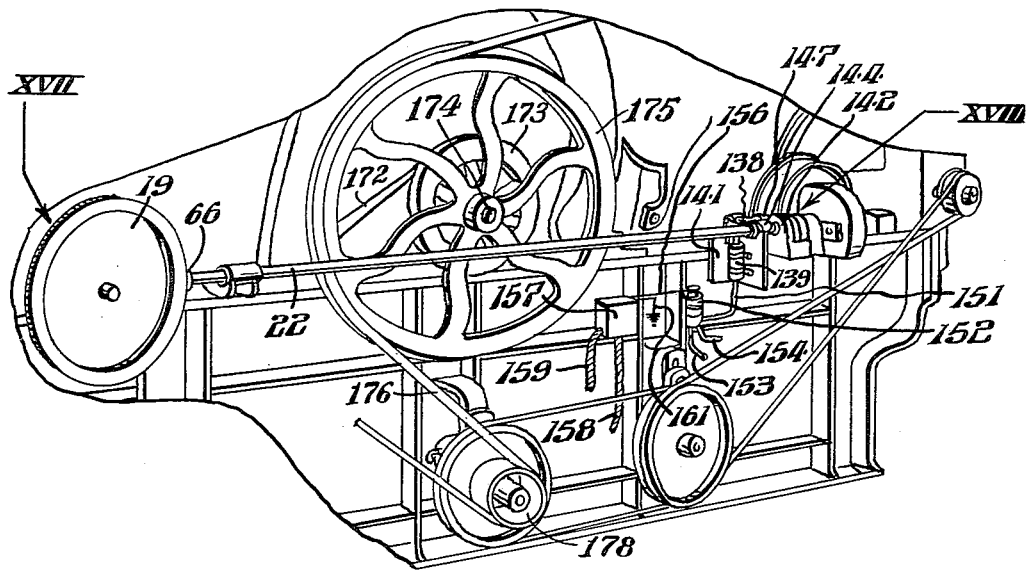
FIG-17-
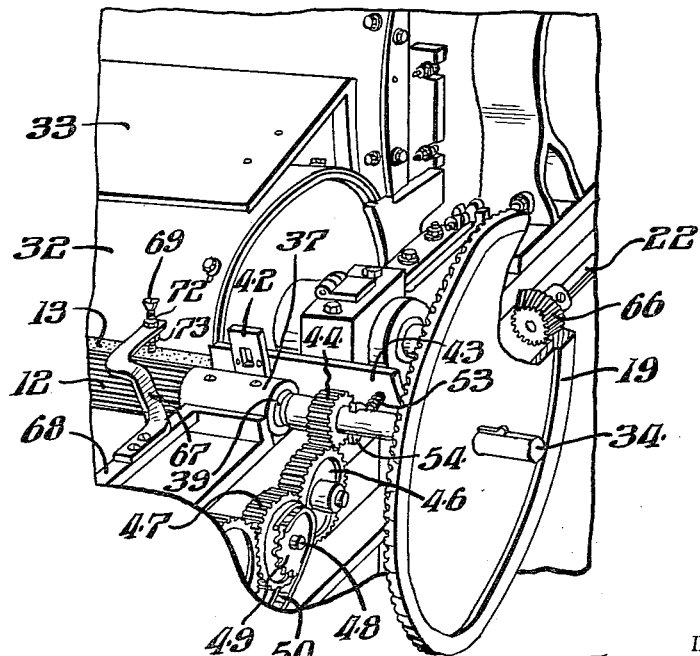
INVENTOR.
John W. McLean,
BY Paul & Paul
ATTORNEYS.

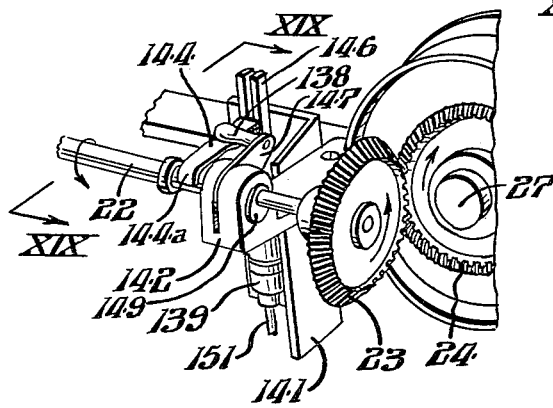
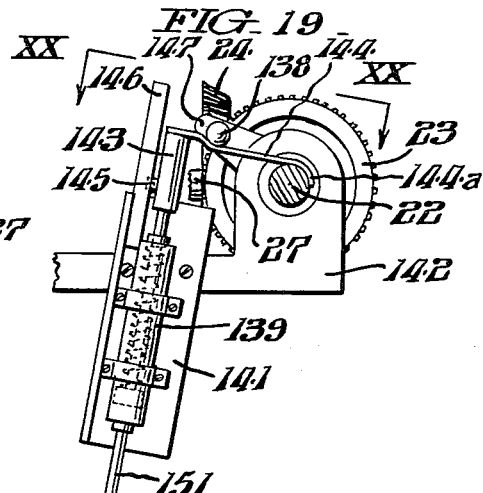
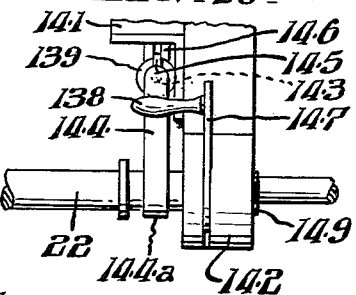
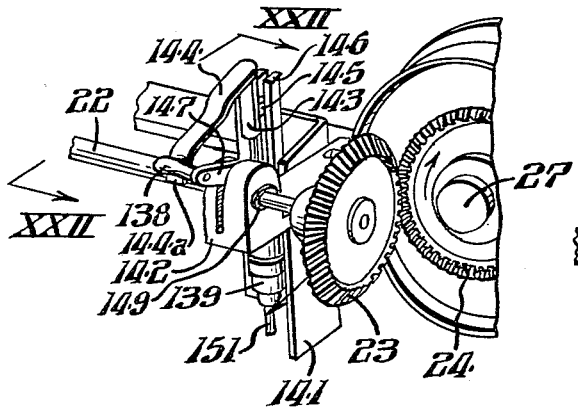
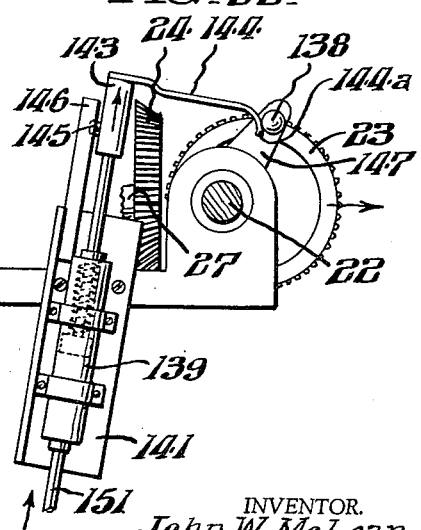

June 11, 1963
J. W. McLEAN
3,092,875
STOP MOTION MECHANISM
Filed Nov. 3, 1959
9 Sheets-Sheet 9
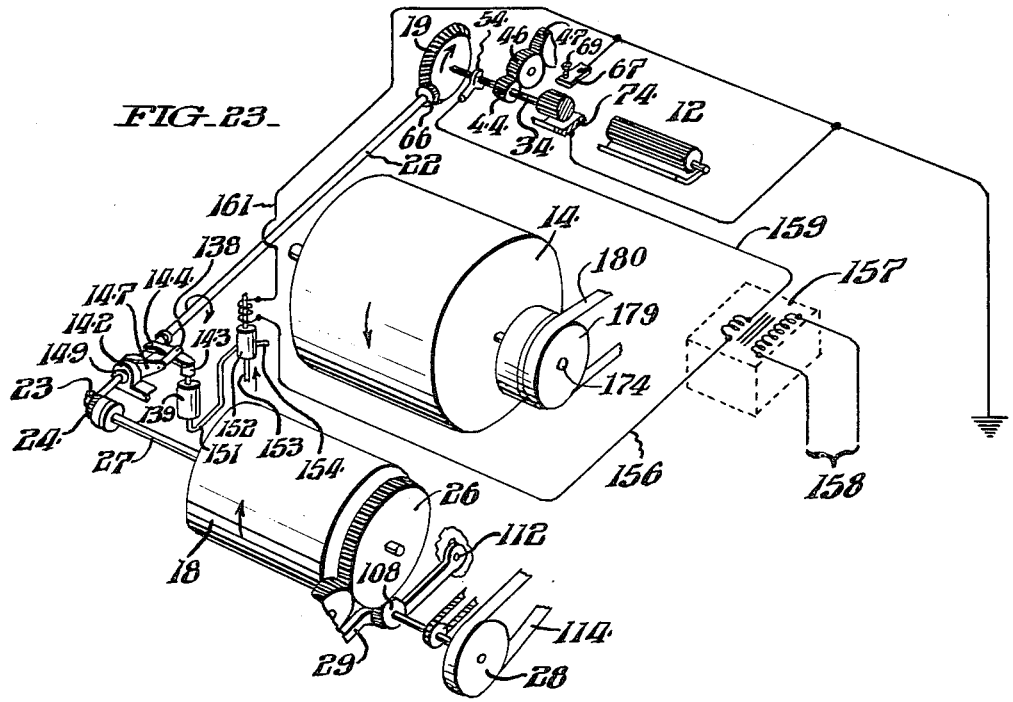
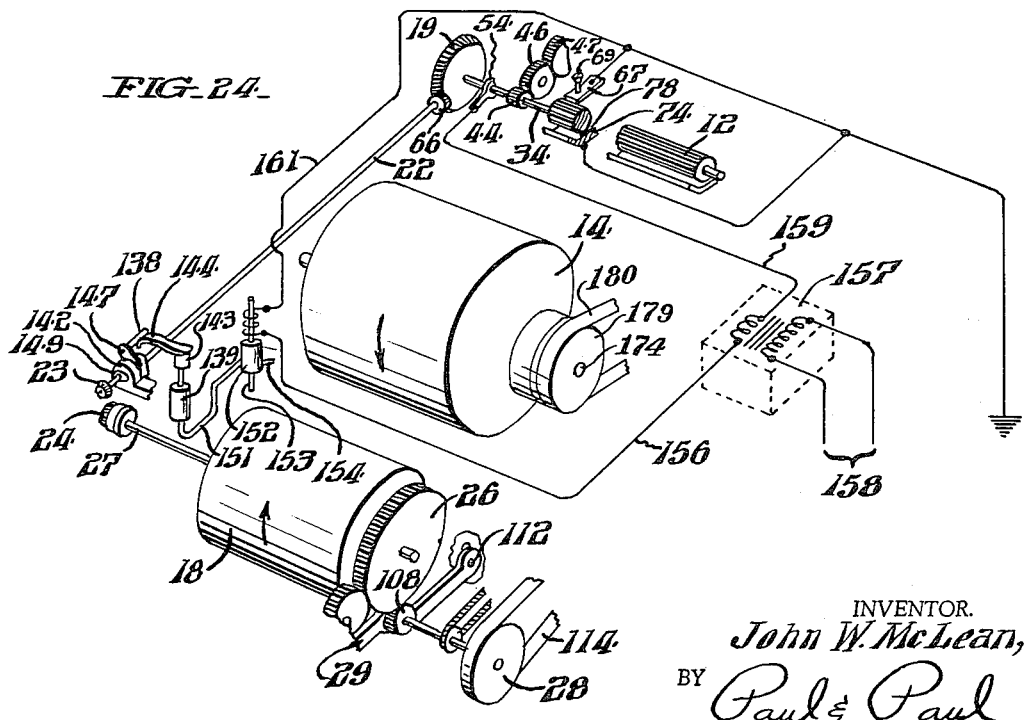
INVENTOR.
John W. McLean,
BY Paul & Paul
ATTORNEYS.

United States Patent Office 3,092,875
Patented June 11, 1963

3,092,875
STOP MOTION MECHANISM
John W. McLean, Gastonia, N.C., assignor to Cocker Machine & Foundry Company, Gastonia, N.C., a corporation of North Carolina
Filed Nov. 3, 1959, Ser. No. 850,643
14 Claims. (Cl. 19—.23)

This invention relates to carding machines as used in the preparation of fibers. More particularly, this invention relates to an automatic stop motion mechanism for such machines.

Considerable inconvenience and delay have frequently been encountered in the operation of carding machines of the kind conventionally used in the preparation of woolen and other fibers owing to the tendency of the stock under certain circumstances to form a double lap or "choke" which enters the lickerin of the machine and causes a choke therein against the mote knives which are displaced thereby and, unless reset, will improperly prepare the fibers before their reception by the main cylinder. Another difficulty frequently encountered in the operation of carding machines of the kind referred to has been caused by the entrance into the machine of foreign objects such as pieces of metal and the like which are embedded or entrained in the stock being passed into the machine whereby great damage is caused to the mote knives, the lickerin and card clothing of the cylinders.

In addition to the difficulties caused by "chokes" and foreign objects entering the machine at the feed end thereof, time consuming delays have frequently been caused as a result of the end of the lap continuing to go around the doffer roll instead of being drawn away therefrom and deposited in the adjacent card can, or as a result of a top of a sliver from the card can falling over on the doffer roll, all of which tends to cause a jamming of the machine and which results in serious delay and necessity for repairs.

Accordingly, it is an object of this invention to provide a stop motion mechanism for carding machines which includes sensing means for the automatic detection of a "choke" in the lap or stock, of foreign objects embedded therein, and of sliver or lap ends, and the like, which tend to become wound about the doffer roll.

It is another object of this invention to provide a stop motion mechanism for carding machines whereby any foreign metallic object embedded in the stock passing into the machine is prevented from passing beyond the feed roll, thereby protecting the lickerin and card clothing from any damage which might result from the entrance of such an object into the machine.

It is another object of this invention to provide a stop motion mechanism for carding machines whereby the doffer roll of such machines will automatically stop whenever the end of a lap continues to go up and around said doffer roll.

It is another object of this invention to provide a stop motion mechanism for carding machines whereby a double lap or choke is prevented from passing into the machine beyond the feed roll whereby displacement of the mote knives or other damage to the carding machine is avoided.

Other objects and attendant advantages will become apparent hereinafter from a reading of the following description and in the drawings wherein:

FIG. 5 is a cross-sectional view taken as indicated by the lines and arrows V—V in FIG. 4.

FIG. 6 is a cross-sectional view taken as indicated by the lines and arrows VI—VI in FIG. 4.

FIG. 7 is a view of the feed roll section similar to FIG. 6 showing one arrangement of the elements thereof for actuating the stop motion mechanism of this invention.

FIG. 8 is a view of the feed roll section similar to FIG. 6 showing another possible arrangement of the elements thereof for actuating the stop motion mechanism of this invention.

FIG. 9 is a view in perspective broken to show right and left side views of the doffer section of the carding machine as generally indicated by the arrow and Roman numeral IX in FIG. 1.

FIG. 10 is a partial side view of the doffer section taken as indicated by the lines and arrows X—X in FIG. 9.

FIG. 11 is a view of the doffer section similar to FIG. 10 showing an arrangement of the elements thereof for actuating the stop motion mechanism of this invention.

FIG. 12 is a partial view in perspective of the right side of the carding machine as generally indicated by the arrow and Roman numeral XII of FIG. 2.

FIG. 13 is a diagrammatic representation of the stop motion mechanism of this invention showing the arrangement thereof during the normal running condition of the carding machine.

FIG. 16 is an enlarged partial side view in perspective of the carding machine of FIG. 1 illustrating a modification of the stop motion mechanism as provided in accordance with this invention.

FIG. 17 is a partial view in perspective of the left-side of the carding machine taken as indicated by the arrow and Roman numeral XVII in FIG. 16.

FIG. 18 is a partial view in perspective of the left side of the carding machine taken as generally indicated by the arrow and the Roman numeral XVIII in FIG. 16.

FIG. 19 is a sectional view taken as indicated by the lines and arrows XIX—XIX in FIG. 18.

FIG. 20 is a partial plan view taken as indicated by the lines and arrows XX—XX in FIG. 19.

FIG. 21 is a view in perspective similar to FIG. 18 showing another arrangement of the elements thereof.

FIG. 22 is a view in section taken as indicated by the lines and arrows XXII—XXII in FIG. 21.

FIG. 23 is a diagrammatic representation of the modified stop motion mechanism of this invention showing the arrangement thereof during the normal running condition of the carding machine.

FIG. 24 is a diagrammatic representation of the modified stop motion mechanism of this invention showing the arrangement thereof when the motion of the feed roll has been stopped.

Figure 1:
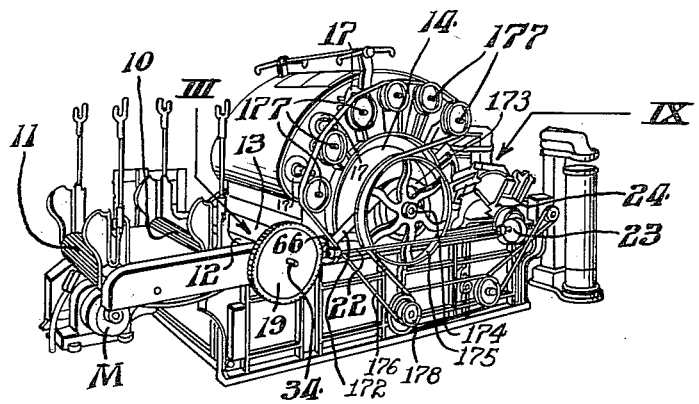
FIG. 1 is a view in perspective of the left side of a carding machine of the type with which this invention may be associated.

The following description is directed to the specific forms of the invention as shown in the drawings and is not intended to be addressed to the scope of the invention as exemplified thereby. It will be appreciated that the drawings represent preferred embodiments of the invention which is capable of being practiced in a wide variety of forms and arrangements.

Figure 2:
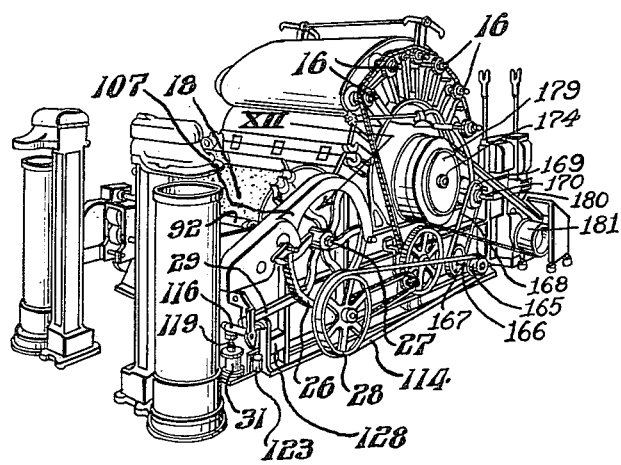
FIG. 2 is a view in perspective of the right side of the carding machine in FIG. 1.

Adverting herewith to the specific forms of the invention illustrated in the drawings, FIGS. 1 and 2 illustrate a typical carding machine of the kind to which the stop motion mechanism of this invention is adapted, the principal working parts of which, as illustrated from feed end to discharge end, are as follows, their location being only generally indicated by the associated numerals: front and back lap rolls 10 and 11, a feed roll 12, a lickerin roll 13, six worker rolls 16 raised in an arch above the main cylinder 14, six stripper rolls 17 similarly arranged above the main cylinder, and a doffer roll 18. In addition there are shown in the left side view of FIG. 1, a feed roll gear 19, side shaft 22, a side shaft bevel gear 23, and a doffer pulley and bevel gear 24. In the right side view of FIG. 2 are shown a doffer gear 26 and doffer shaft 27, a production pulley 28, a drop lever 29, and an air cylinder 31.

Figure 3:
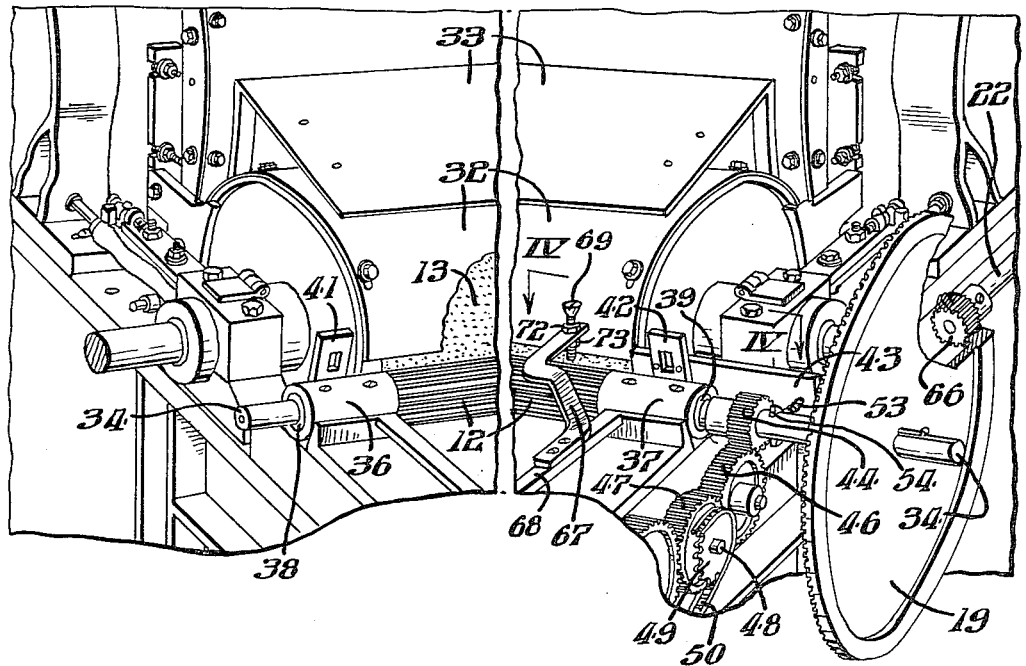
FIG. 3 is a view in perspective broken to show both right and left side views of the feed roll section of the carding machine as generally indicated by the arrow and Roman numeral III in FIG. 1.

As may best be seen in FIG. 3, the feed roll 12 is disposed adjacent the lickerin roll 13 which is enclosed beneath the bonnet 32 above which is disposed a lickerin plate 33. The feed roll 12 is provided with an axial shaft 34 which extends through the feed roll bearing boxes 36 and 37 on the right side and the left side of the carding machine respectively. Between the axial shaft 34 and the fed roll bearing boxes 36 and 37 are positioned cylindrical fiber bushings 38 and 39. Forward of the feed roll bearing boxes 36 and 37 and immediately adjacent thereto are positioned feed roll bearing supports 41 and 42 respectively. To the feed roll bearing support 42 there is bolted an insulating block 43 of fibrous material which extends parallel to the feed roll shaft 34 at the left hand side of the carding machine so that the terminal end thereof is positioned between the feed roll bevel gear 19 and a second feed roll gear 44 located on the shaft 34 inwardly of the feed roll bevel gear 19. Adjacent the feed roll gear 44 and in engagement therewith is a lap roll gear 46 made of fibrous insulating material and which also engages a second lap roll gear 47 affixed to the shaft 48 adjacent a lap roll driving sprocket 49 which is rotated by a driving chain 50.

Figure 4:
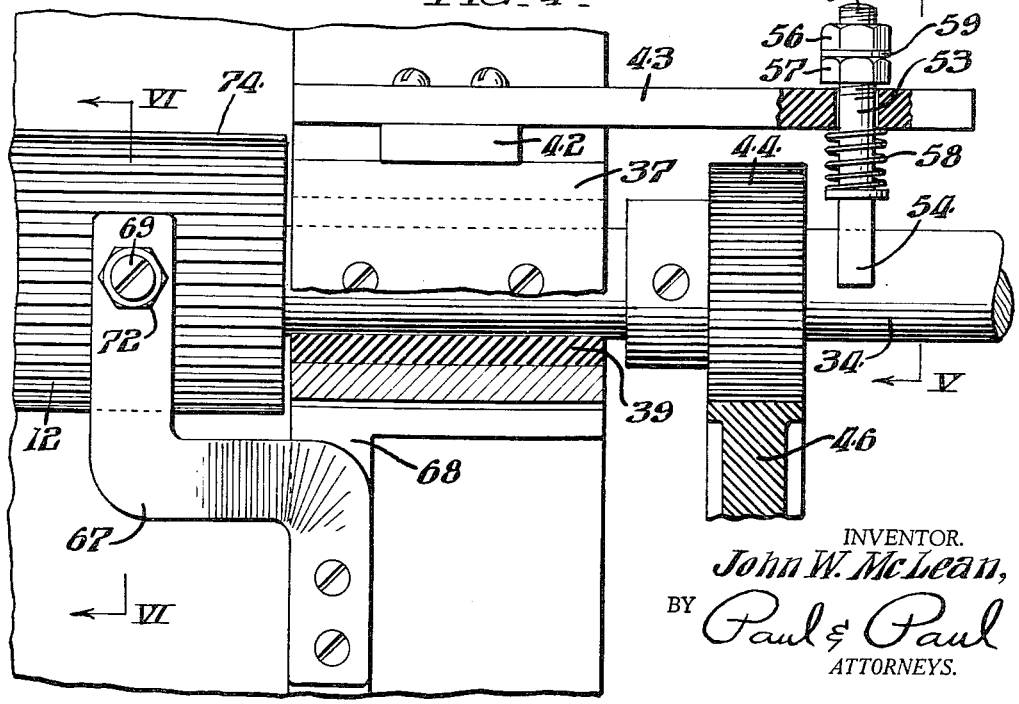
FIG. 4 is a plan view of a part of the feed roll section taken as indicated by the lines and arrows IV—IV in FIG. 3.

As may best be seen in FIG. 4, a contact rod 53 having a feed roll shaft contact sleeve 54 at one end thereof is secured to the insulating block 43 through a hole near the distal end thereof by the nuts 56 and 57 on one side of the insulating block 43 and the spring 58 on the other side thereof, the compression force of which normally urges the contact sleeve 54 into contact with the feed roll shaft 34. A contact plate 59 is gripped between the nuts 56 and 57 attached to the threaded end 53a of the contact rod 53. To the contact plate 59 there is secured by the screw 62 the end of an electric current-carrying wire 63 carried within the armored cable 64.

Referring again to FIG. 3, it will be seen that the side shaft 22 carries at the distal end thereof a beveled draft change fiber gear 66 made of insulating material which engages the feed roll bevel gear 19. From the foregoing description it will be clear that the feed roll 12, its shaft 34, and associated gears 19 and 44 are completely insulated from the remaining metallic parts of the machine by reason of the fiber gears 46 and 66 and the insulating block 43.

Referring again to FIG. 3, an upper contact bracket 67 is securely bolted to a lap plate 68 on the left side of the carding machine. The bracket 67 is generally Z-shaped so that the free end thereof extends to a point directly above the axis of the rotation of the feed roll 12 and is further elevated so that the bracket does not come into contact with the feed roll at any point. Fixed in a threaded hole in the free end of the upper contact bracket 67 is an adjustable contact screw 69 which can be set for any desired contact gap between the screw and the feed roll 12. Nuts 72 and 73 are provided on the adjustable screw 68 above and below the upper contact bracket 67 respectively which may be tightened to hold the adjustable screw 69 fixedly in position.

As best seen in FIGS. 6, 7, and 8, feed roll 12 is underpassed by an upwardly curving feed roll plate 74 which guides the stock 76 as it passes between the feed roll 12 and said feed roll plate. In FIG. 7 the numeral 77 designates a thickening or "choke" of the stock as it passes beneath the feed roll. In FIG. 8 a metallic tack 78 is shown lodged in the stock between the feed roll 12 and the feed roll plate 74.

In FIG. 9 a doffer roll 18 is illustrated enclosed within a doffer box and arch 82 and covered by a bonnet 83. Bolted to the doffer box and arch 82 immediately beneath doffer grinding stands 84 and 86 are insulating fiber stands 87 and 88 on the left side and the right side of the carding machine respectively. The fiber stands 87 and 88 provide support for a metal rod 89 which extends across the width of the doffer box and which has riveted thereto a six-inch wide fiber flap 92 of masonite or the like, which extends across the width of the doffer and which is set to a very close gauge thereto. To the doffer arch 82 at the left side of the machine is bolted a metal contact plate 93 immediately above the doffer brush stand 94. The metal contact plate 93 is provided with a fiber contact rest 95 and a metal contact stop 96 both extending at right angles to the surface of the vertical plate and aligned vertically with respect to each other. A metal contact rod 97 is secured to the horizontally extending metal rod 89 by means of a screw nut 98 provided for that purpose. As may be seen in FIGS. 9–11, the metal contact rod 97 extends between the fiber contact rest 95 and the metal contact stop 96 so that the contact rod 97 contacts alternatively the insulated fiber contact rest 95 or the metal contact stop 96. FIG. 11 illustrates the manner in which the contact rod 97 contacts the metal contact stop 96 whenever an object or material such as the stock or lap 76 is interposed between the doffer roll 18 and the fiber flap 92. A screw 99 is threaded into the end of metal rod 89 for the retainment of the electric current-carrying wire 102 in contact with the aforesaid metal rod.

Referring again to FIG. 9, a balance rod 103 is inserted into the metal rod 89 at the right side of the doffer box transversely to the axis thereof and is secured therein by means of a screw 104. Slidably affixed to the balance rod 103 is a balance weight 105 which may be fixed in the desired position on the balance rod 103 by the screw 106.

FIG. 12 is an enlarged view of a portion of the right side of the carding machine illustrated in FIG. 2 showing the manner in which the doffer gear 26, which is positioned beneath a protective cover 107, engages a production change gear 108 which is itself positioned on a production pulley stud 109 disposed immediately beneath the doffer gear 26. The production pulley stud 109 extends outward from the drop-lever 29 to which it is rotatably secured in a suitable bearing provided for that purpose in the aforesaid lever. Drop-lever 29 is arranged to swing about the pivot 112.

As may be seen in the diagrammatic drawing of FIG. 13, the production pulley 28, hereinbefore mentioned, is mounted on the distal end of the production pulley stud 109 and receives the drive belt 114 which is itself connected to the remainder of the drive assembly of the machine, hereinafter more fully detailed. It will be evident that the production pulley stud 109 functions as a drive shaft of the drive assembly to rotate the doffer roll through the production change or driving gear 108 and the doffer gear 26.

Referring again to FIG. 12, a drop-lever cam 116 is supported in a drop-lever cam bracket 118 provided for that purpose so that the curved surface 116a of the cam underlies and supports the distal end of the drop-lever 29.

Disposed immediately beneath the lever portion of the cam 116 is a plunger 119 of a spring-loaded air cylinder 31 which is arranged to receive air under pressure through a tube 122 leading from an air valve 123. The air valve 123 has an inlet tube 124 for bringing air under pressure from a source of supply (not shown) and also an air exhaust tube 126. Leading into the solenoidal air valve is the electrical wire 127 which brings electrical current from a six-volt transformer 128. A second line 129 leading into the air valve 123 is grounded to the carding machine. The lines 131 and 132 bring current to the transformer from an electric power source (not shown).

As may be seen in the diagrammatic drawing of FIG. 13, the plunger 119 is provided with a lever arm 133 positioned to trip the switch 134 connected in circuit with a drive motor M of the carding machine. In addition to the insulated bevel gear 66 at one end of the side shaft 22, there is a metal bevel gear 23 at the opposite end thereof which engages still another bevel gear 24 at the left end of the doffer shaft 27.

Figure 14:
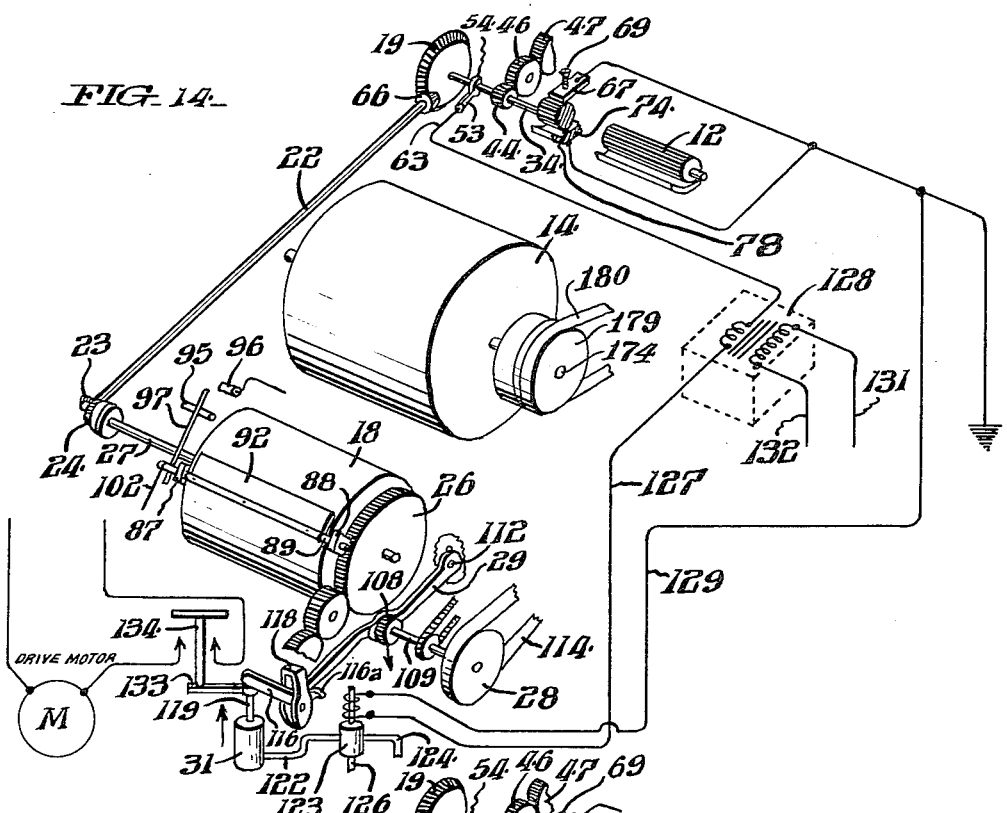
FIG. 14 is a diagrammatic representation of the stop motion mechanism of this invention showing the arrangement thereof when the drive of the carding machine has been stopped by the action of the feed roll mechanism.
Figure 15:
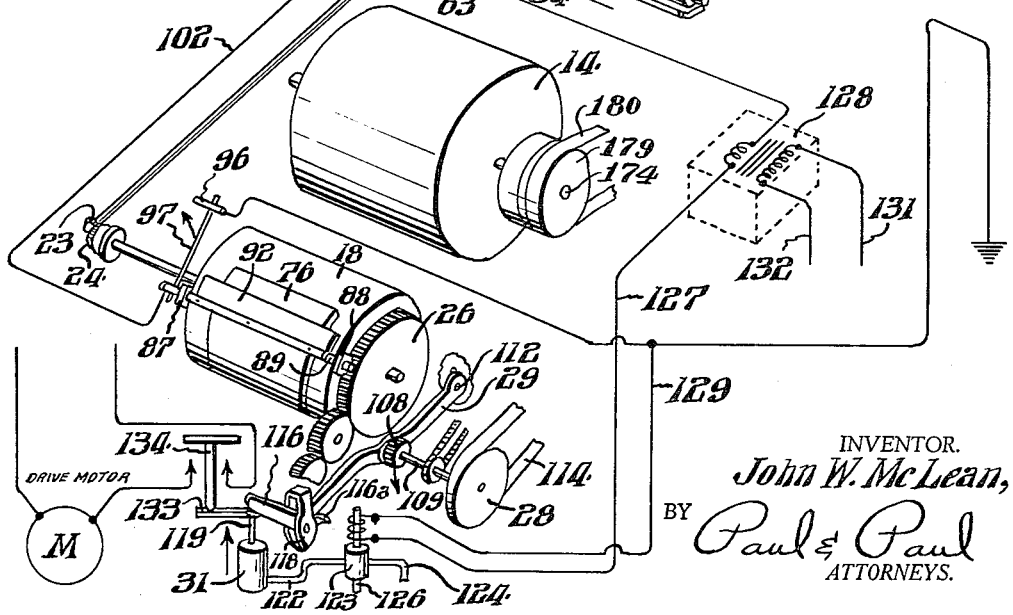
FIG. 15 is a diagrammatic representation of the stop motion mechanism of this invention showing the arrangement thereof when the drive of the carding machine has been stopped by the action of the doffer mechanism.

As may be seen in FIGS. 13 through 15 electrical circuits are provided in accordance with the stop motion mechanism of this invention which comprise respectively feed roll 12 and its shaft 34, the contacts 69 and 74 which are both grounded to the carding machine, a contact 54, electric current carrying wires 63 and 127 connected thereto and leading to the transformer 128 and the solenoid of air valve 123. From the aforesaid solenoid of air valve 123, the line 129 is grounded to the card. Another circuit comprises the contact stop 96 which is grounded to the carding machine, contact rod 97, the metal support rod 89, the electric current carrying wires 102, 63 and 127 leading into the transformer 128 and thence into the solenoid of the air valve 123.

FIGS. 16–24 illustrate a modification of the stop motion mechanism of this invention which is designed to disengage the feed roll only from the chain of gears and thereby stop the feeding of stock into the machine. As may be seen in the left side view of FIG. 16, the side shaft 22 has a side shaft knock-off handle 138 at one end thereof by means of which the side shaft bevel gear 23 may be disengaged from the doffer shaft bevel gear 24. An air cylinder 139 is fixed in position beneath the knock-off handle 138 by means of an air cylinder bracket 141 secured to side shaft support 142. As may best be seen in FIGS. 18–22, the air cylinder 139 is provided with a plunger 143 having a lever arm 144 normally extending just under the side shaft knock-off handle 138, and having a curved portion 144a for contact with the side shaft 22. The air cylinder plunger 143 is arranged for vertically reciprocal movement and is provided with a stud 145 which extends into a vertical slot of a plunger guide 146 adjacent the plunger. The knock-off handle 138 is affixed to an end of a disengaging lever 147 which is attached at its other end to the side shaft 22. Seated within the bracket 142 is an eccentric cam 149 which is fixed to the side shaft 22 for movement therewith when said side shaft is rotated by throwing the disengaging lever 147 either forward or backward. It will be seen that disengaging lever 147 and its knock-off handle 138 are positioned on the side shaft 22 immediately adjacent the side shaft bevel gear 23 hereinbefore described as engaging the doffer bevel 24 as illustrated in FIGS. 18 and 19.

Referring again to FIG. 16, an air tube 151 leads from the air cylinder 139 to a solenoidal air valve 152 which is connected to a source of air supply through a tube 153 and which is also provided with an air exhaust tube 154 at the bottom thereof. An electrical current carrying line 156 leads from the solenoid of the air valve 152 to a six-volt transformer 157. From the transformer 157 an electrical cable 158 leads to a source of electric power and another electric cable 159 leads to the shaft 34 of the feed roll 12. A second electric line 161 leading from the air valve 152 is grounded to the card.

It will be seen from FIG. 17 that the feed roll 12 is insulated in this modification of the stop motor mechanism of this invention in like manner as in the preceding form thereof. The electrical cable 159 is attached to the end of a contact rod 53, the sleeve 54 of which is normally urged by the spring 58 into contact with the shaft 34, all as hereinbefore described in the preceding form of the invention.

An electrical circuit is provided in accordance with the modification of this invention which comprises the feed roll 12, and its shaft 34, the contacts 69 and 74 which are grounded to the card, the contact 54 connected to the wire 159 which leads into the transformer 157, the electric current carrying wire 156 leading from the transformer 157 into the solenoid of the air valve 152 and the electric current carrying wire 161 leading from the aforesaid solenoid to be grounded to the card.

As may be seen in FIG. 2, drive belt 114 also passes around a production drive lickerin pulley 165 positioned forwardly of the production pulley 28. The pulley 165 is mounted to a shaft 166 rotatably secured in bearings at the side of the carding machine. Also mounted to the shaft 166 is a lickerin idler pulley 167 which receives a drive belt 168 arranged to ride also on a lickerin pulley 169. The lickerin pulley 169 is mounted on the shaft 170 of the lickerin roll 13 for rotation therewith. To the other end of the lickerin roll shaft 170 on the opposite side of the carding machine there is similarly mounted another lickerin driving pulley not shown in FIG. 1, which receives a drive belt 172. The drive belt 172 is also arranged to pass around another lickerin driving pulley 173, mounted on the shaft 174 of the main cylinder 14. Also mounted on the shaft 174 of the main cylinder 14 is a stripper driving pulley 175 which receives a drive belt 176 arranged to pass around stripper roll pulleys 177 and a stripper idler pulley 178. To the opposite end of the shaft 174 of the main cylinder 14 is mounted a cylinder pulley 179 which receives a drive belt 180 arranged to pass around a motor pulley 181. The motor pulley 181 is rotated by the motor M.

*Operation*

Ordinarily in the practice of this invention the elements of the stop motion mechanism, as provided in accordance therewith, are arranged as seen in FIG. 13 during the normal running condition of the carding machine. The stock or lap is led into the carding machine at the feed roll end between the feed roll 12 and the feed roll plate 74, past a lickerin roll (not shown), then up over the main cylinder where it is subjected to the action of the stripper rolls and worker rolls (not shown). From there the stock passes to the doffer roll 18 which revolves in the opposite direction to the main cylinder, as indicated by the arrows in FIG. 13. Finally, as the stock emerges from beneath the doffer roll 18, it is directed into the card cans at the end of the carding machine (not shown in FIG. 13). During the normal running of the carding machine, the circuits of the stop motion mechanism of this invention remain open, as may be seen by the fact that the feed roll 12 is neither in contact with the feed roll plate 74 nor with the contact 69 directly above the feed roll. Likewise, the contact rod 97 normally rests on the contact rest 95 out of contact with the electrical contact 96.

Whenever a "choke" or other uneven part of the lap passes between the feed roll 12 and the feed roll plate 74, "choke" or bunching of the lap which might cause the carding machine to become jammed forces the feed roll upward into contact with contact 69. When the feed roll 12 makes contact with the contact 69, an electrical circuit is completed which comprises, in addition to the feed roll 12 and its shaft 34, contact sleeve 54, the contact rod 53, an electric current-carrying wire 63 from the contact rod 53 to the transformer 128, and the solenoid of the air valve 123. From the contact 69 the current is grounded through the lap plate 68 of the carding machine. The line 129 leading from the air valve is similarly grounded to the carding machine. The closing of the electrical circuit by contact between the feed roll 12 and the contact 69 actuates the solenoid of the air valve 123 which admits air through the tube 122 into the air cylinder 31, whereby the plunger 119 is forced upward against the handle of the cam 116 which is thereby pivoted in its bracket 118 to allow the drop lever 29 to fall from its normal operating position, thereby disengaging the production change gear 108 from the doffer gear 26. With the disengagement of the aforesaid gears the doffer roll is no longer rotated on its shaft 27 by the driving force of the pulley 28. As a consequence of the disengagement of the gear 108 from the doffer gear 26, the side shaft 22 is also stopped, with the result that the gear train comprised by the gears 19, 44, 46 and 47 are likewise stopped. With the stoppage of the feed roll gear 19, the shaft 34 of the feed roll no longer turns and in consequence the stock is no longer fed into the machine. As the plunger 119 rises, in addition to lifting the lever of the cam 116, it also brings upward the arm 133 to trip open the switch 134, thereby breaking the electrical circuit which includes the drive motor of the carding machine. With the stopping of the drive motor M the remaining rolls of the carding machine including the main cylinder 14 are also stopped.

Occasionally foreign matter in the form of pieces of metal of various kinds become mixed or embedded in the stock 76 which will cause considerable damage to the carding machine if drawn thereinto with the stock. In accordance with the stop motion mechanism of this invention, whenever a piece of metal, such as a tack 78, shown in FIG. 8, is drawn between the feed roll 12 and the feed roll plate 74, the foreign metallic itself forms the contact which completes the electrical circuit actuating the stop motion mechanism of this invention. When the circuit is completed by contact of the metal tack 78 with the feed roll 12 and the feed roll plate 74, the solenoid of the air valve 123 is actuated, whereupon air is admitted through the tube 122 into the valve 31 and as a consequence the plunger 119 again raises the lever of the cam 116 to cause the drop lever 29 to drop and disengage the gear 108 from the doffer gear 26. In like manner as before, the doffer 18 and its shaft 27 no longer rotate with the result that the side shaft 22 and feed roll gear 19 also stop, thereby stopping the feed roll 12 and its shaft 34. In like manner as before also, the lever 133 trips open the switch 134 to stop the drive motor M and the remaining rolls of the machine. When the feed roll 12 has been stopped as a result of contact having been made thereby either with the contact 69 or the feed roll plate through a foreign metallic object such as the tack 78, either of the obstructions which have caused the contact be made in either one or the other of the ways aforedescribed may be removed to prevent the entrance of the obstruction into the carding machine before again starting up the machine.

The stop motion mechanism according to this invention is also actuated whenever the stock is in some manner improperly directed away from the doffer roll as, for example, when a top of sliver from the card can falls over on the doffer, or when the end of the stock or lap goes around the doffer or the like. When an end strikes the fiber flap 92 causing it to move outward from the doffer roll, the movement of the flap 92 will cause the rotation of the support rod 89 which in turn causes the contact rod 97 to rise from its position against the insulated rest 95 and to come into contact with the electrical contact 96, thereby completing a circuit comprising the aforesaid rod 97, the electrical transformer 128, and the air valve 123. With the closing of the circuit the solenoid of the air valve 123 is actuated so that air is admitted into the air cylinder 31 through the tube 122 causing the plunger 119 to rise and, as aforedescribed, raise the lever of the cam 116, thereby causing the drop lever 29 to drop and disengage the production change gear 108 from the doffer gear 26. In like manner as before, both the doffer roll 18 and the feed roll 12 are stopped, whereupon the end of the lap or other obstruction causing the fiber flap 92 to move may be removed and again directed out of the carding machine. In like manner as before also, the plunger 119 through the arm 133 trips switch 134 to open a circuit including the drive motor M which stops the motor and the remaining rolls of the carding machine.

According to a modified form of this invention, only the feed roll 12 and the front and back lap rolls are stopped by the stop motion mechanism as provided therein in the event that one or another kind of obstruction attempts to pass between the feed roll 12 and the feed roll plate 74. As in the preceding form of the invention, electrical contact closing an electrical circuit is made whenever a "choke" or other irregular part of the lap causes the feed roll to be pushed upward and to be put into contact with the contact 69 or whenever a foreign metallic object, such as the tack 78 illustrated in the previous form of this invention. Upon closing the electrical circuit by contact between the feed roll 12 and the feed roll plate 74, the solenoid of the air valve 152 is actuated to release air through the tube 151 into the air cylinder 139, thereby causing the plunger 143 to rise and by means of its associated lever 144 to push upward against the handle 138 to cause the disengaging lever 147 to be thrown outwardly into the position shown in FIG. 21. The downwardly curved portion 144a of the arm 144 presses against the handle 138 and maintains the disengaging lever in the disengaging position as shown in FIG. 22. When the disengaging lever 147 is thrown into disengaging position, the side shaft 122 is turned together with the eccentric cam 149 causing the side shaft bevel gear 23 to move away from engagement with the doffer bevel gear 24. On disengagement of the aforesaid gears the side shaft 22 ceases its rotation, as does the feed roll bevel gear 19 and the feed roll shaft 34, whereupon the feed roll is stopped. Upon the stopping of the feed roll 12, the obstruction is removed and the carding machine is again started by return of the elements of the stop motion mechanism to their arrangement for normal running condition as shown in FIG. 23. With the resumption of normal running conditions there is no contact between either the plate 74 or the contact 69 and the feed roll 12 with the result that the electrical circuits of the stop motion mechanism are open and the solenoid of the air valve 152 is no longer actuated, with the result that air is exhausted through the tube 154 causing the plunger to turn to its unextended position as shown in FIG. 19. The bevel gears 23 and 24 may be again engaged by throwing the disengaging lever 147 into the engaging position shown in FIGS. 18 and 19.

Although in the specific embodiment of this invention one arrangement has been shown whereby certain gears have been disengaged for the purpose of stopping specific parts of the carding machine and at the same time the motor has been switched off which provides the main drive for the machine, it will be evident that the invention is not limited to the specific means of stopping either the rolls of the machine or the machine itself. For example, in some cases it may be desirable to leave the motor running when disengaging the production change gear from the doffer gear, thereby stopping only the front and back lap rolls, the feed roll, and the doffer roll. Likewise, other combinations of the mechanical parts of the invention may be used for stopping various of the rolls of the carding machine in connection with the sensing devices as provided therein.

In addition to the essential simplicity and economy of the stop motion mechanism as provided in accordance with this invention it is an important feature thereof that not only are chokes and foreign objects prevented from entering the machine under the feed roll, but also entanglements and other dislocations of the stock with respect to the doffer roll are immediately sensed and the machine immediately stops before damage is done and repair becomes necessary.

Although this invention has been disclosed with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described my invention, I claim:

1. In a carding machine, a stop motion mechanism comprising a feed roll having an insulated shaft, a feed roll plate positioned beneath said feed roll, a contact element positioned above said feed roll, said shaft, plate and contact element being connected together in electrical circuit, said feed roll and said contact element being arranged to close said electrical circuit when said feed roll is moved into contact with said element, said feed roll and said plate being arranged to close said electrical circuit when a current-conducting object is in contact therebetween, a doffer roll, movable sensing means positioned adjacent said doffer roll and arranged for the detection of an obstruction with respect to said roll, said sensing means being connected in said electrical circuit and arranged to close said circuit when said obstruction is detected, a drive assembly, including a motor, for said machine, a gear train arranged to connect said feed roll and said doffer roll to each other and to said drive assembly, means connected to said gear train and to said electrical circuit for the disengagement of said gear train from said drive assembly when said circuit is closed, and switch means connected to the motor of said drive assembly and to said electrical circuit for stopping said drive assembly when said circuit is closed.

2. In a carding machine, a stop motion mechanism comprising a feed roll having an insulated shaft, a feed roll plate positioned beneath said feed roll, a contact stud positioned above said feed roll, said shaft, plate and contact stud being connected together in electrical circuit, said feed roll and said contact stud being arranged to close said electrical circuit when said feed roll is moved into contact with said stud, said feed roll and said plate being arranged to close said electrical circuit when a current-conducting object is in contact therebetween, a doffer roll, movable sensing means positioned adjacent said doffer roll and arranged for the detection of an obstruction with respect to said roll, said sensing means being connected in said electrical circuit and arranged to close said circuit when said obstruction is detected, a drive assembly for said machine, a gear train arranged to connect said feed roll and said doffer roll to each other and to said drive assembly, said gear train including a doffer gear disposed adjacent said doffer roll, said drive assembly including a production change gear and shaft therefor, said shaft having a drop lever disposed thereon adjacent said production change gear, said shaft and lever being adapted to vertical movement for engagement and disengagement of said production change gear and said doffer gear, an air cylinder disposed adjacent said drop lever, and means connected to said cylinder and to said electrical circuit for actuating said cylinder to drop said lever when said circuit is closed.

3. The stop motion mechanism defined in claim 2 wherein said electrical circuit includes means connected to said drive assembly for stopping said drive assembly when said circuit is closed.

4. The stop motion mechanism defined in claim 3 wherein said drive assembly includes an electric motor and wherein said means for stopping said drive assembly comprises a lever attached to said air cylinder, said lever being adapted to trip the switch of said motor.

5. In a carding machine, a stop motion mechanism comprising a feed roll having an insulated shaft, a feed roll plate positioned beneath said feed roll, an electrical contact stud positioned above said feed roll, said shaft, plate and stud being connected together in electrical circuit, said feed roll and said stud being arranged to close said electrical circuit when said feed roll is moved into contact with said stud, said feed roll and said plate being arranged to close said electrical circuit when a current-conducting object is in contact therebetween, a doffer roll, movable sensing means positioned adjacent said doffer roll and arranged for the detection of an obstruction with respect to said roll, said sensing means being connected in said electrical circuit and arranged to close said circuit when said obstruction is detected, a drive assembly for said machine, a gear train arranged to connect said feed roll and said doffer roll to each other and to said drive assembly, said gear train including a doffer gear attached to said doffer roll, said drive assembly including a rotatable shaft extending adjacent said doffer gear and a production change gear mounted on said shaft and adapted to engage said doffer gear, said shaft and said production change gear being arranged for movement toward and away from said doffer gear, whereby said doffer gear and said production change gear are engaged and disengaged, a drop lever pivotally secured to said machine at one end thereof and arranged to support the end of said shaft adjacent said doffer gear, said lever having a movable cam adjacent the free end thereof, said cam being adapted to release said lever, an air cylinder positioned adjacent said cam and arranged to pivot said cam, and an air valve connected to said cylinder and to said electrical circuit and adapted to admit air into said cylinder when said circuit is closed.

6. In a carding machine, a stop motion mechanism comprising a feed roll having an insulated shaft, a feed roll plate positioned beneath said feed roll, an adjustable contact screw positioned above said feed roll, said feed roll being arranged for vertical movement toward and away from said contact screw, said shaft, plate and contact element being connected together in electrical circuit, said feed roll and said contact screw being arranged to close said electrical circuit when said feed roll is moved into contact with said screw, said feed roll and said plate being arranged to close said electrical circuit when a current-conducting object is in contact therebetween, a doffer roll, a movable detector flap arranged for normal proximity to the surface of said doffer roll, said flap being secured to an insulated metallic support rod, said support rod being disposed parallel to said surface of said doffer roll, a contact rod secured to an end of said support rod, a contact stud disposed in proximity to said contact rod, said support rod, contact rod and stud being connected together in said electrical circuit, said contact rod and stud being arranged to close said electrical circuit when said flap moves away from said surface of said doffer roll, a drive assembly for said machine a gear train arranged to connect said feed roll and said doffer roll to each other and to said drive assembly, said gear train including a doffer gear attached to said doffer roll, said drive assembly including a rotatable shaft extending adjacent said doffer gear and a production change gear mounted on said shaft and adapted to engage said doffer gear, said shaft and said production change gear being arranged for movement toward and away from said doffer gear, whereby said doffer gear and said production change gear are engaged and disengaged, a drop lever pivotally secured to said machine at one end thereof and arranged to support the end of said shaft adjacent said doffer gear, said lever having a movable cam adjacent the free end thereof, said cam being adapted to release said lever, an air cylinder positioned adjacent said cam and arranged to pivot said cam, and an air valve connected to said cylinder and to said electrical circuit and adapted to admit air into said cylinder when said circuit is closed.

7. The stop motion mechanism defined in claim 6 wherein said electrical circuit is a six volt circuit and is supplied with electrical current from a circuit of higher voltage and wherein said first-mentioned circuit comprises means for reducing the voltage of said second-mentioned circuit.

8. In a carding machine, a stop motion mechanism comprising a feed roll having an insulated shaft, a feed roll plate positioned beneath said feed roll, an electrical contact stud positioned above said feed roll, said shaft, plate and contact stud being connected together in electrical circuit, said feed roll and said contact stud being arranged to close said electrical circuit when said feed roll is moved into contact with said stud, said feed roll and said plate being arranged to close said electrical circuit when a current-conducting object is in contact therebetween, a gear train arranged to connect said feed roll to the drive assembly of said machine, said gear train including a side shaft and a doffer shaft disposed perpendicularly to each other, each of said shafts having a gear at an end thereof, said gears being adapted for mutual engagement, said side shaft having a knock-off handle for movement of said shaft toward and away from said doffer shaft whereby said gears are engaged and disengaged, an air cylinder disposed adjacent said knock-off handle, said cylinder having a plunger in contact with said handle, said plunger being arranged to engage said handle and rotate said shaft upon actuation of said cylinder and means connected to said air cylinder and to said electrical circuit for actuation of said cylinder when said circuit is closed.

9. In a carding machine, a stop motion mechanism comprising a feed roll having an insulated shaft, a feed roll plate positioned beneath said feed roll, an electrical contact stud positioned above said feed roll, said shaft, plate and contact stud being connected together in electrical circuit, said feed roll and said stud being arranged to close said electrical circuit when said feed roll is moved into contact with said stud, said feed roll and said plate being arranged to close said electrical circuit when a current-conducting object is in contact therebetween, a drive assembly for said machine, a gear train arranged to connect said feed roll to said drive assembly, said gear train including a side shaft and a doffer shaft disposed perpendicularly to each other, each of said shafts having a gear at an end thereof, said gears being adapted for mutual engagement, said side shaft being journalled in an eccentric cam adjacent said side shaft gear, said side shaft having a knock-off handle for rotation of said side shaft whereby said gears are engaged and disengaged, an air cylinder disposed adjacent said knock-off handle, said cylinder having a plunger adapted to engage said handle and rotate said shaft and an air valve connected to said cylinder and to said electrical circuit and adapted to admit air to said cylinder when said circuit is closed.

10. The stop motion mechanism defined in claim 9 wherein said air valve is actuated by an electrical solenoid.

11. The stop motion mechanism defined in claim 10 wherein said electrical circuit is a six volt circuit and is supplied with electrical current from a circuit of higher voltage and wherein said first-mentioned circuit includes transformer means for reducing the voltage of said second-mentioned circuit.

12. In a carding machine, a stop motion mechanism comprising a doffer roll, a detector flap disposed adjacent said doffer roll in proximity to the surface thereof, a doffer gear mounted on the shaft of said doffer roll, a drive assembly for said machine, said drive assembly including a drive shaft extending adjacent said doffer gear and a drive gear mounted on said shaft and arranged for engagement with said doffer gear, a drop lever pivoted to said machine, said lever being arranged for the support of said drive shaft and for the movement thereof to engage and disengage said drive gear and said doffer gear, an air cylinder disposed adjacent said drop lever, said cylinder having a plunger arranged to contact and pivot said lever to move said shaft and a solenoid valve connected to said cylinder for the actuation thereof, said valve being connected in electrical circuit with said detector flap and arranged to respond to a displacement thereof.

13. In a carding machine, a stop motion mechanism comprising a doffer roll, a detector flap disposed adjacent said doffer roll in proximity to the surface thereof, an electrical contact stud disposed adjacent said detector flap, a contact rod connected to said detector flap and arranged to move therewith, said contact rod being normally spaced apart from said stud and arranged to contact said stud upon displacement of said flap, a doffer gear mounted on the shaft of said doffer roll, a drive assembly for said machine, said drive assembly including a drive shaft extending adjacent said doffer gear and a drive gear mounted on said shaft and arranged for engagement with said doffer gear, a drop lever pivoted to said machine, said lever being arranged for the support of said drive shaft and for the movement thereof to engage and disengage said drive gear and said doffer gear, an air cylinder disposed adjacent said drop lever, said cylinder having a plunger arranged to contact and pivot said lever to move said shaft and an electrical valve connected to said cylinder for the actuation thereof, said valve being connected in electrical circuit with said contact stud and arranged to respond to the closing of said circuit whenever said rod contacts said stud.

14. In a carding machine, a stop motion mechanism comprising a doffer roll, movable sensing means positioned adjacent said doffer roll in proximity to the surface thereof and arranged to close an electrical circuit, a drive assembly for said machine, a doffer gear attached to the shaft of said doffer roll and arranged to connect said doffer roll with said drive assembly, said drive assembly including a rotatable shaft extending adjacent said doffer gear and a production change gear mounted on said shaft and adapted to engage said doffer gear, said shaft and production change gear being arranged for movement toward and away from said doffer gear, whereby said doffer gear and said production change gear are engaged and disengaged, a drop lever pivotally secured to said machine at one end thereof and arranged to support the end of said shaft adjacent said doffer gear, said lever having a movable cam adjacent the opposite end thereof, said cam benig adapted to release said lever, an air cylinder positioned adjacent said cam and arranged to pivot said cam, and a solenoid air valve connected to said cylinder and arranged in electrical circuit with said sensing means, said air valve being arranged to admit air into said cylinder whenever said sensing means closes said circuit.

References Cited in the file of this patent

UNITED STATES PATENTS

| 2,270,720 | Thompson | Jan. 20, 1942 |

FOREIGN PATENTS

| 485,755 | Germany | Nov. 6, 1929 |
| 613,800 | Great Britain | Dec. 2, 1948 |
| 683,212 | Great Britain | Nov. 26, 1952 |